(12) United States Patent
Prakash et al.

(10) Patent No.: US 10,769,171 B1
(45) Date of Patent: Sep. 8, 2020

(54) RELATIONSHIP ANALYSIS AND MAPPING FOR INTERRELATED MULTI-LAYERED DATASETS

(71) Applicant: Palantir Technologies Inc., Palo Alto, CA (US)

(72) Inventors: Arjun Prakash, New York, NY (US); Becky Moore, Palo Alto, CA (US); Jakub Pilch, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 235 days.

(21) Appl. No.: 15/900,301

(22) Filed: Feb. 20, 2018

Related U.S. Application Data

(60) Provisional application No. 62/595,902, filed on Dec. 7, 2017.

(51) Int. Cl.
*G06F 16/00* (2019.01)
*G06F 16/26* (2019.01)
(Continued)

(52) U.S. Cl.
CPC .......... *G06F 16/26* (2019.01); *G06F 16/2264* (2019.01); *G06F 16/288* (2019.01)

(58) Field of Classification Search
None
See application file for complete search history.

(56) References Cited

U.S. PATENT DOCUMENTS 5,515,488 A   5/1996  Hoppe et al.
6,430,305 B1  8/2002  Decker
(Continued)

FOREIGN PATENT DOCUMENTS

CN  102546446  7/2012
CN  103167093  6/2013
(Continued)

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

(Continued)

*Primary Examiner* — Son T Hoang
(74) *Attorney, Agent, or Firm* — Sheppard Mullin Richter & Hampton LLP

(57) ABSTRACT

Systems and methods are provided for analyzing and visualizing relationship of multi-layered datasets. A system stores original datasets in a datastore. The system generates first derivative datasets from the original datasets, and generates second derivative datasets from at least the first derivative datasets. The system determines relationships among the original datasets, the first derivative datasets, and the second derivative datasets, based on an analytical relationship between two datasets, a similarity relationship between two datasets, a modification relationship between two datasets, and a user-interaction relationship between two datasets. Then, the system generates a node map including at least part of the original datasets, the first derivative datasets, and the second derivative datasets as a node, and at least part of the determined analytical, similarity, modification, and user-interaction relationships between two nodes as a link.

16 Claims, 5 Drawing Sheets

(51) Int. Cl.
    *G06F 16/28*     (2019.01)
    *G06F 16/22*     (2019.01)

(56) References Cited

U.S. PATENT DOCUMENTS

| | | |
|---|---|---|
| 6,820,135 B1 | 11/2004 | Dingman |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 9,928,241 B2 * | 3/2018 | Frei ................... G06Q 90/00 |
| 10,043,409 B1 * | 8/2018 | Nash ................... G09B 5/02 |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0022000 A1 * | 1/2007 | Bodart ............... G06Q 10/0639 |
| | | 705/7.38 |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett et al. |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |

(56) References Cited

U.S. PATENT DOCUMENTS

| | | |
|---|---|---|
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0281873 A1* | 9/2014 | Frew .................. G06F 17/2288 715/229 |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2012/061162 | 5/2012 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Gill et al., "Computerised Linking of Medical Records: Methodological Guidelines,".

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.

(56) References Cited

OTHER PUBLICATIONS

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in 18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): Wirn Vietri 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

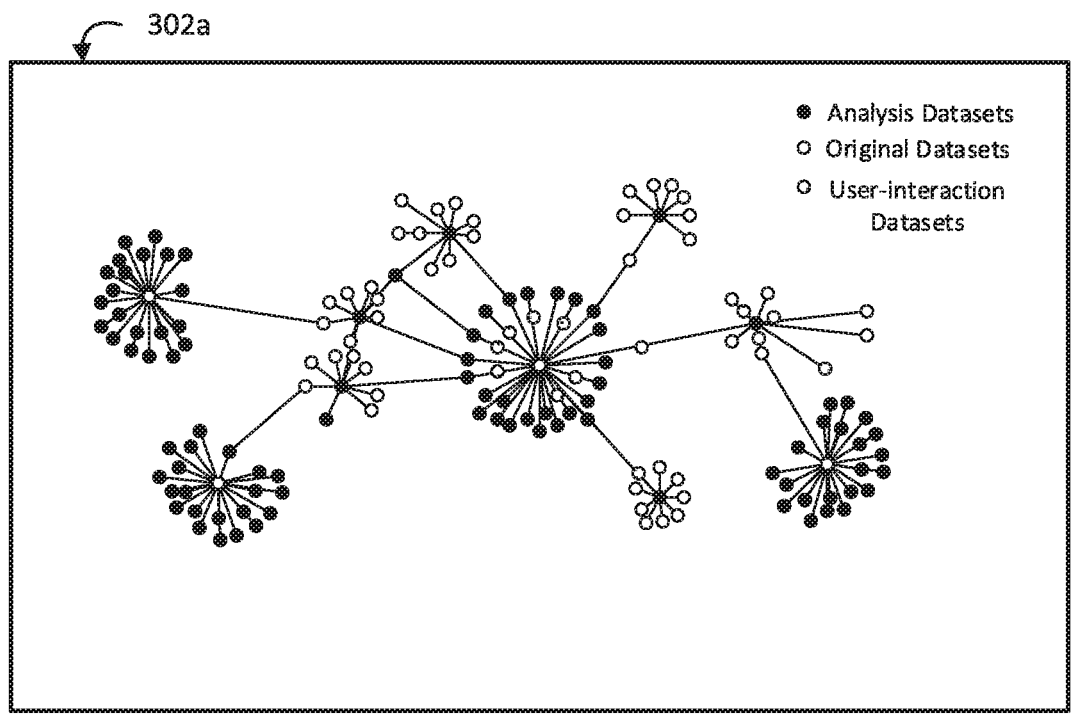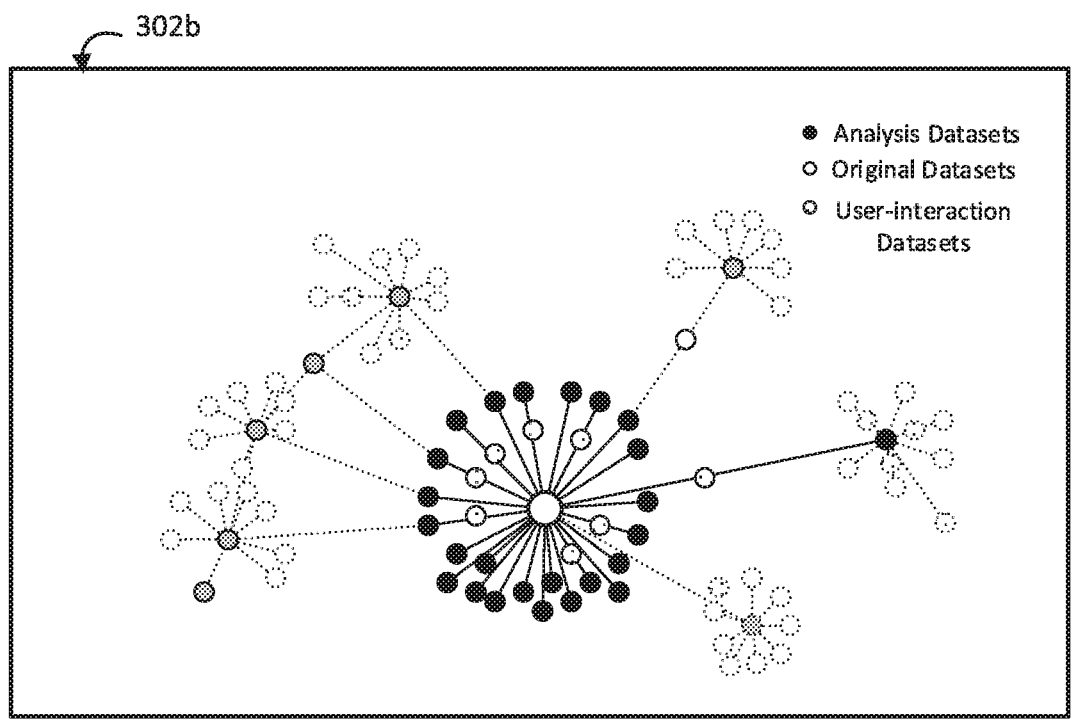
FIG. 3

RELATIONSHIP ANALYSIS AND MAPPING FOR INTERRELATED MULTI-LAYERED DATASETS

CROSS REFERENCE TO RELATED APPLICATIONS

This application claims the benefit under 35 U.S.C. § 119(e) of U.S. Provisional Application Ser. No. 62/595,902 filed Dec. 7, 2017, the content of which is incorporated by reference in its entirety into the present disclosure.

FIELD OF THE INVENTION

This disclosure relates to approaches for analyzing and visualizing relationship of multi-layered datasets.

BACKGROUND

Under conventional approaches, a database system stores original datasets and derivative datasets derived from the original datasets, such as analysis datasets that are generated based on analysis of the original datasets, user-interaction datasets that are generated upon interaction of users with the original datasets and/or the analysis datasets, and modifications of the original datasets. Further, the database system may operate to visualize relationships among the original datasets and the derivative datasets, such that users can visually recognize the relationships. As the relationships become more complicated (e.g., when a derivative dataset is generated based on another derivative dataset, and/or when a derivative dataset is generated based on a group of other datasets), existing technologies fail to effectively analyze and/or visualize the relationships among the variety of datasets. As a result, users may not properly recognize the relationships among the datasets and/or may not make proper decisions with respect to the datasets.

SUMMARY

Various embodiments of the present disclosure can include systems, methods, and non-transitory computer readable media. In some embodiments, a system stores original datasets in a datastore. The system generates first derivative datasets from the original datasets, and generates second derivative datasets from at least the first derivative datasets. The system determines relationships among the original datasets, the first derivative datasets, and the second derivative datasets, based on an analytical relationship between two datasets, a similarity relationship between two datasets, a modification relationship between two datasets, and a user-interaction relationship between two datasets. Then, the system generates a node map including at least part of the original datasets, the first derivative datasets, and the second derivative datasets as a node, and at least part of the determined analytical, similarity, modification, and user-interaction relationships between two nodes as a link.

In some embodiments, the system further generates third derivative datasets based on consumption of at least the second derivative datasets, wherein the determined relationships are among the original datasets, and the first, second, and third derivative datasets, and the node map also includes at least part of the third derivative datasets as a node.

In some embodiments, the system further filters the original datasets, the first derivative datasets, and the second derivative datasets, wherein the node map is generated based on the filtered datasets. In some embodiments, the filtering is carried out at least based on times at which datasets were generated.

In some embodiments, the system further generates, in response to selection of a node included in the node map, a focused node map indicating the selected node and one or more nodes linked with the selected node with emphasis.

In some embodiments, the analytical relationship includes a relationship between a dataset and an analysis dataset that was generated based on analysis thereof. In some embodiments, the similarity relationship includes a relationship among a plurality of datasets that were analyzed together. In some embodiments, the modification relationship includes a relationship between a dataset and a modified dataset that was generated based on modification thereof. In some embodiments, the user-interaction relationship includes a relationship between a dataset and a user dataset of a user that has interacted therewith.

In some embodiments, the node map is generated repeatedly at different points in time, and the system further presents transition of the generated node maps.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3 illustrates examples of a node map GUI for presenting dataset relationships according to some embodiments.

DETAILED DESCRIPTION

A claimed solution rooted in computer technology overcomes problems specifically arising in the realm of computer technology. In various implementations, a computing system employs multiple-layered relationship analysis among at least original datasets, first derivative datasets derived from the original datasets, and second derivative datasets from the original datasets. Specifically, a computing system stores original datasets in a datastore, generates the first derivative datasets from the original datasets, and generates the second derivative datasets from at least the first derivative datasets. Then, the computing system determines relationships among the original datasets, the first derivative datasets, and the second derivative datasets, based on an analytical relationship between two datasets, a similarity relationship between two datasets, a modification relationship between two datasets, and a user-interaction relationship between two datasets. Thereafter, the computing system generates a node map including at least part of the original datasets, the first derivative datasets, and the second derivative datasets as a node, and at least part of the determined analytical, similarity, modification, and user-interaction relationships between two nodes as a link.

Figure 1:
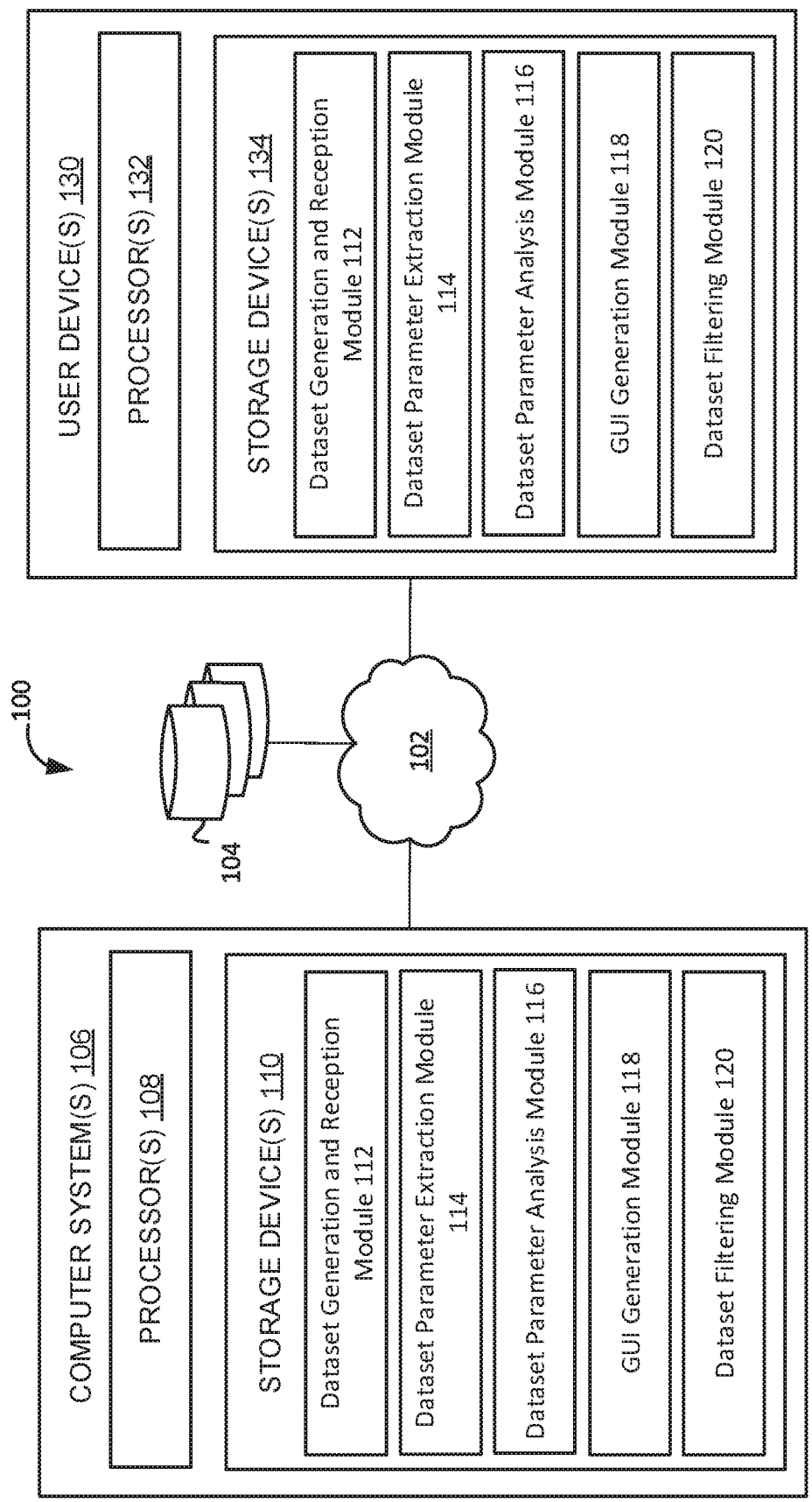
FIG. 1 illustrates an example of a dataset relationship management system for managing relationships among datasets according to some embodiments.

FIG. 1 illustrates an example of a dataset relationship management system 100 for managing relationships among datasets according to some embodiments. In the example shown in FIG. 1, the dataset relationship management system 100 includes one or more computer systems 106, one or more user devices 130, and a dataset database 104 in communication via network 102. The dataset database 104 is illustrated in FIG. 1 as separate from the computer system(s) 106 and the user device(s) 130. In implementations, the dataset database 104 may be stored on the computer system(s) 106, the user device(s) 130, or at a remote location.

In the example of the system shown in FIG. 1, one or more of the computer system(s) 106 is intended to represent a computer system configured to provide dataset relationship management service. In some embodiments, one or more of the computer system(s) 106 is configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to generate and/or receive datasets, analyze datasets, and determine relationships among datasets.

Figure 5:
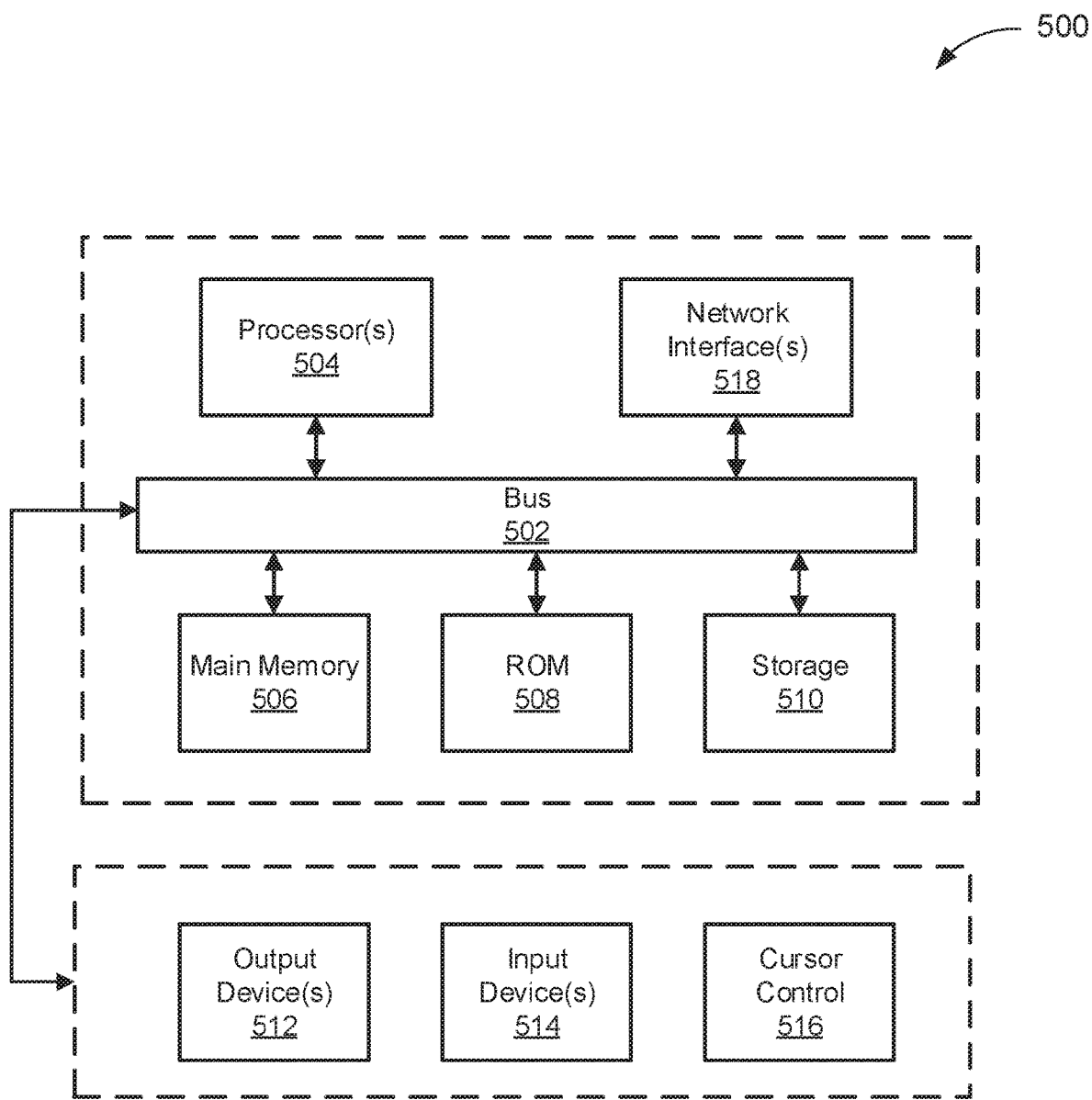
FIG. 5 is a block diagram that illustrates a computer system upon which any of the embodiments described herein may be implemented.

In the example of the system shown in FIG. 1, one or more of the computer system(s) 106 includes one or more processors 108 (also interchangeably referred to herein as processors 108, processor(s) 108, or processor 108 for convenience), one or more storage devices 110, and/or other components. In some embodiments, the processors 108 are programmed by one or more computer program instructions stored on a storage device 110. In some embodiments, the processors 108 are programmed by a dataset generation and reception module 112, a dataset parameter extraction module 114, a dataset parameter analysis module 116, a graphical user interface (GUI) generation module 118, and a dataset filtering module 120, and/or other instructions that program the computer system 106 to perform various applicable operations, each of which are described in greater detail herein. As used herein, for convenience, the various applicable instruction modules will be described as performing an operation, when, in fact, various applicable instructions program the processors 108 (and therefore computer system 106) to perform the various applicable operations. Further details and features of a computer system 106 configured for implementing features of the described invention may be understood with respect to computer system 500 as illustrated in FIG. 5.

In the example of the system shown in FIG. 1, one or more of the user device(s) 130 is intended to represent a computing system configured to use the dataset relationship management service. In some embodiments, one or more of the user device(s) 130 is configured as a server device, a gaming console, a handheld gaming device, a personal computer (e.g., a desktop computer, a laptop computer, etc.), a smartphone, a tablet computing device, and/or other device that can be programmed to generate and/or receive datasets, analyze datasets, and determine relationships among datasets.

In the example of the system shown in FIG. 1, one or more of the user device(s) 130 includes one or more processors 132 (also interchangeably referred to herein as processors 132, processor(s) 132, or processor 132 for convenience), one or more storage devices 134, and/or other components. In some embodiments, the processors 132 are programmed by one or more computer program instructions. In some embodiments, the processors 132 are programmed by a dataset generation and reception module 112, a dataset parameter extraction module 114, a dataset parameter analysis module 116, a graphical user interface (GUI) generation module 118, and a dataset filtering module 120, and/or other instructions that program the user device(s) 130 to perform various applicable operations, each of which are described in greater detail herein. As used herein, for convenience, the various applicable instruction modules will be described as performing various applicable operations, when, in fact, the various applicable instructions program the processors 132 (and therefore the user device 130) to perform the various applicable operations.

In some embodiments, various aspects of the dataset relationship management system 100 operate on the computer system(s) 106 and/or on the user device(s) 130. That is, the various modules described herein each operate on one or both of the computer system(s) 106 and/or the user device(s) 130. For example, in an exemplary implementation, a user device 130 comprising a smartphone runs the dataset generation and reception module 112, permitting a user to enter one or more datasets (e.g., original datasets) into the user device 130. Then, the user device 130 communicates with the computer system(s) 106 via the network 102, and the computer system(s) 106 receives information of the datasets via the dataset generation and reception module 112 and performs various applicable functions via the dataset parameter extraction module 114, the dataset parameter analysis module 116, the GUI generation module 118, and the dataset filtering module 120. Other potential divisions of features between the user device(s) 130 and the computer system(s) 106 may be implemented without departing from the scope of the invention(s).

In some embodiments, the dataset generation and reception module 112 serves as a module in operation on the computer system(s) 106 and/or on the user device(s) 130. In a more specific implementation, the dataset generation and reception module 112 includes programming instructions that cause the computer system(s) 106 and/or the user device(s) 130 to receive a dataset that is internally generated within the computer system(s) 106 and/or on the user device(s) 130, or externally generated outside of the computer system(s) 106 and/or on the user device(s) 130. A dataset can contain any applicable contents and be in an any applicable format. For example, the dataset is a text file in a format such as HTML, PDF, Microsoft Office, etc., an image file in a format such as JPEG, GIF, TIFF, etc., an audio file in a format such as MP3, WAV, WMA, etc., a video file in a format such as AVI, MPEG, MP4, etc., a compressed file in a format such as ZIP, an object file in a format such as exe, and so on. A dataset is, for example, generated by an external application running on the computer system(s) 106 and/or on the user device(s) 130, which is different from an application for implementing the dataset relationship management system 100. In this paper, datasets that are not generated derivatively from other datasets managed in the dataset relationship management system 100 are referred to as original datasets.

In another more specific implementation, the dataset generation and reception module 112 includes programming instructions that cause the computer system(s) 106 and/or the user device(s) 130 to generate one or more original datasets. The original datasets generated by the dataset generation and reception module 112 may or may not be distinguished from original datasets generated by external applications.

In still another more specific implementation, the dataset generation and reception module 112 includes programming instructions that cause the computer system(s) 106 and/or the user device(s) 130 to generate various applicable derivative datasets based on the original datasets. Depending on a specific implementation, the various applicable derivative datasets may include an analysis dataset that is generated based on analysis of one or more datasets, a user-interaction dataset that is generated upon interaction of one or more users with one or more original datasets and/or other non-user-interaction datasets (e.g., analysis datasets, modification datasets), and a modification dataset, which is a modification and/or transformation of other datasets (e.g., original datasets, analysis datasets, user-interaction datasets). In a specific implementation, the analysis of a dataset may include analysis made based on or using any applicable tools such as drill-down analytical tools, time-series tools, spreadsheet applications, and so on. Also, depending on a specific implementation, the various applicable derivative datasets may be generated automatically by the dataset generation and reception module 112 based on a specific dataset generation algorithm, and/or by user input. In some embodiments, the dataset generation and reception module 112 stores the received datasets and/or the generated datasets in applicable datastore such as the dataset database 104.

In some embodiments, the dataset parameter extraction module 114 serves as a module in operation on the computer system(s) 106 and/or on the user device(s) 130. In some embodiments, the dataset parameter extraction module 114 includes programming instructions that cause the computer system(s) 106 and/or the user device(s) 130 to extract parameter information from data fields of one or more datasets. Parameter extraction may include an analysis of various data fields of contents of the datasets and/or an analysis of various data fields of metadata of the datasets to generate additional information related to the parameter. Newly-generated information may be stored with or separately from the original datasets. Although the current discussion refers to extracted parameters being stored with the original dataset(s), this is for exemplary purposes only.

In some embodiments, the dataset parameter extraction module 114 implements a transform, translation, normalization, and/or other operation on a data field of a dataset in extracting a parameter. In a specific implementation, parameter extraction on a dataset may include performing image analysis on image data, performing automatic speech recognition on audio data, performing both image analysis and automatic speech recognition on video data, and/or performing textual analysis on text data. In a specific implementation, parameter extraction on a dataset may return parameter analysis information capable of being compared to parameter analysis information of a similar type. In a specific implementation, parameter extraction on a dataset may include extraction of chronological information indicating time when a dataset is generated, analyzed, accessed, modified, saved, and so on.

In some embodiments, the dataset parameter extraction module 114 performs parameter extraction on textual information using a TF-IDF (term frequency-inverse document frequency) method, as follows. In some implementations, textual information may be translated to a common language prior to analysis. In some implementations, text may be analyzed without translation. In some implementations, text may be parsed via the use of various text parsing tools, including, for example, a stemmer tool configured to break words down into word stems. Stemming tools may be useful when performing word frequency analysis, as various forms of the same word may all be counted as the same word.

In some embodiments, translation includes the use of a dataset specific key-word dictionary. Engineering terms may not translate directly based on standard translation dictionaries. For example, due to language idiosyncrasies and usage patterns, the French or Spanish description of a dataset may not match the English description after translation. Accordingly, foreign language words for dataset description may be specifically mapped to their translated equivalents by the dataset specific key-word dictionary.

After initial text preparation, TF-IDF may proceed. Each word stem (or word, if stemming has not been performed), may have a TF-IDF score computed for it. The TF-IDF for each word stem may be computed by the equation tf-idf(t, d)=(# times term t occurs in document d)*log((# documents)/(1+(# documents containing term t))). Thus, the formula multiplies the term frequency by the inverse document frequency. The term frequency is computed as the number of times the term t appears in the document d. The inverse document frequency is computed as the logarithm of the total number of documents divided by one plus the number of documents containing the term t. Terms that occur more frequently in all documents may have a low IDF, while rare terms may have a high IDF. As can be seen, the term inside the logarithm of the IDF calculation approaches one as the number of documents containing the term increases. Thus, the IDF approaches zero. Accordingly, for extremely common words such as 'the,' 'an,' etc., the TF-IDF score approaches zero. Thus, the TF-IDF method scores each word stem based on how frequently it appears in a document offset by how frequently it appears throughout other documents. As used by the dataset parameter extraction module 114, the TF-IDF method may be performed on unstructured text fields (e.g., dataset description) of datasets as documents. The documents to which each unstructured text field is compared may include unstructured text fields of all datasets stored in the dataset database 104.

In some embodiments, the dataset parameter extraction module 114 computes the IDF of one or more terms in datasets stored in the dataset database 104 and store IDF information in association with the dataset database 104. IDF information may be stored for a predetermined number of terms, and may be filtered based on a document frequency of each term. Computing and storing IDF information of terms in the dataset database 104 may reduce a computational load during parameter extraction. For example, when computing TF-IDF results for a dataset that is newly introduced to the dataset 104, the dataset parameter extraction module 114 may compute term frequencies for word stems in the new document and compare with the stored IDF values to compute TF-IDF values. The dataset parameter extraction module 114 may further update the stored IDF values when new data is introduced to the dataset database 104.

In some embodiments, the dataset parameter extraction module 114 is configured to perform TF-IDF analysis on an audio data field of a dataset after an automatic speech recognition process is performed on the dataset.

In some embodiments, the dataset parameter analysis module 116 serves as a module in operation on the computer system(s) 106 and/or on the user device(s) 130. In some embodiments, the dataset parameter analysis module 116 includes programming instructions that cause the computer system(s) 106 and/or the user device(s) 130 to compute a relationship of two or more datasets stored in the dataset database 104, based on the parameters extracted by the dataset parameter extraction module 114. In some embodiments, the dataset parameter analysis module 116 performs comparison of parameter values between two or more datasets (hereinafter, referred to as "target datasets"). The comparison results of these computations may be stored with datasets in a related data field, or in any other suitable data structure.

In some embodiments, the dataset parameter analysis module 116 obtains, as a comparison result, a type of relationship among multiple datasets. The type of relationship includes an analysis relationship, an inclusive relationship, a modification relationship, a user relationship, and a management relationship. In more detail, an analysis relationship includes a relationship in which a dataset is generated based on analysis of other one or more datasets and a relationship in which a dataset is generated together with another dataset based on analysis of one or more datasets. For example, when dataset B is generated based on analysis of dataset A, dataset A has an analyzed-in relationship (i.e., A used in B) with dataset B, and dataset B has an analyzed-by (i.e., B uses A) with dataset A. In more detail, an inclusive relationship includes a relationship in which a dataset is included in another dataset. In more detail, a modification relationship includes a relationship in which a dataset is generated based on modification of another dataset. In more detail, a user relationship includes a relationship in which a dataset is generated based on user's origination or user access of another dataset. For example, when dataset A is created based on origination of a user B represented by dataset B, dataset A has a created-by relationship (i.e., A is created by a user B) with dataset B, and dataset B has a created relationship (i.e., B created A) with dataset A. Similarly, when dataset A is modified by a user B represented by dataset B, dataset A has a modified-by relationship (i.e., A is modified by a user B) with dataset B, and dataset B has a modified relationship (i.e., B modified A) with dataset A. Similarly, when dataset A is viewed by a user B represented by dataset B, dataset A has a viewed-by relationship (i.e., A is viewed by a user B) with dataset B, and dataset B has a viewed relationship (i.e., B viewed A) with dataset A. Similarly, when dataset A is shared by a user B represented by dataset B, dataset A has a shared-by relationship (i.e., A is shared by a user B) with dataset B, and dataset B has a shared relationship (i.e., B shared A) with dataset A. In some embodiments, with respect to the various types of relationships, APIs of "analyzed_in" "analyzed_by" "analyzing" "in_analysis_with" "in_path_with" "saved_in" "saving" "modifier_of" "user_of" "modified_by" "used_by", "in-folder-with", "created_by" "created" "modified_by" "modified" "viewed_by" "viewed" "shared_with" and "shared_by" may be employed.

In some embodiments, comparison among datasets is performed according to a data gravitation classification (DGC) algorithm in order to determine a proximity degree of datasets. The DGC algorithm is a data classification algorithm based on data gravitation, and the basic principle of the DGC algorithm is to classify datasets by comparing the data gravitation between different data classes. In the DGC algorithm, a kind of "force" called data gravitation between two datasets is computed. Datasets from the same class are combined as a result of gravitation. On the other hand, data gravitation between different data classes can be compared. A larger gravitation from a class means a dataset belongs to a particular class. One outstanding advantage of the DGC, in comparison with other classification algorithms is its simple classification principle with high performance. Further, in order to implement a DGC algorithm, feature weights of extracted parameters are also computed. The feature weights can be computed by applicable algorithms.

The comparison results of parameter values may be stored as comparison sets, including at least a comparison result (e.g., matching degree) and a dataset identifier (ID) of target datasets. Comparison sets may be stored in the dataset database 104 and/or in other datastore, and/or in any other suitable data format. In some implementations, a predetermined number of comparison sets may be stored. In some implementations, the comparison sets having the highest scoring comparison values up to the predetermined number may be stored. In some implementations, an unlimited number of comparison sets may be stored. In some implementations, a predetermined threshold comparison value score may be used to determine which comparison sets are to be stored.

As discussed above, the dataset parameter analysis module 116 may compute comparison results and generate comparison datasets for each dataset stored in the dataset database 104. In some implementations, the comparison datasets may be stored in, with, or in association with datasets in the dataset database 104. In some implementations, a dataset including comparison datasets may be exported by the dataset parameter analysis module 116 to the GUI generation module 118. The dataset parameter analysis module 116 may access the dataset database 104 to store comparison value information in the dataset database 104. The dataset parameter analysis module 116 may further store any or all information associated with datasets in the dataset database 104.

In some implementations, the dataset parameter analysis module 116 may be configured to reduce comparison value computation loads. Techniques for reducing computation loads may include reducing the number of datasets between which comparison values are computed and prioritizing the calculation of terms based on feature weights. Reducing the number of datasets between which comparison values are computed may be performed by computing comparison values only between datasets that share certain criteria.

In some embodiments, the GUI generation module 118 serves as a module in operation on the computer system(s) 106 and/or on the user device(s) 130. In some embodiments, the GUI generation module 118 includes programming instructions that cause the computer system(s) 106 and/or the user device(s) 130 to generate a GUI for presenting relationships determined based on parameter analysis by the dataset parameter analysis module 116. In some embodiments, a GUI generated by the GUI generation module 118 includes a node map GUI in which relationships among datasets are presented by a node map format, and a non-map statistic GUI in which relationships among datasets are presented by a non-node map format. Details of GUIs generated by the GUI generation module 118 are discussed below with reference to FIGS. 2 and 3. In some embodiments, the GUI generation module 118 generates a GUI for presenting relationships (e.g., node map) repeatedly at different points in time, and further generates a graphical presentation showing transition of the relationships among the datasets according to time passage.

In some embodiments, the dataset filtering module 120 serves as a module in operation on the computer system(s) 106 and/or on the user device(s) 130. In some embodiments, the dataset filtering module 120 includes programming instructions that cause the computer system(s) 106 and/or the user device(s) 130 to filter datasets for which the GUI presenting relationships is generated by the GUI generation module 118. Filtering criteria employed by the dataset filtering module 120 may include any applicable criteria. For example, the filtering criteria includes one or more of data source or data path (e.g., in path, outside path), last update limit (i.e., a time range during which dataset has been updated), time elapsed since last updates and/or generation, type of datasets (e.g., original datasets, derivative datasets), data state of datasets (e.g., active, discarded, etc.) and key word, and so on. The filtering criteria may be an inclusive criteria with which datasets matching the inclusive criteria are included in the datasets for the GUI or an exclusive criteria with which dataset matching the exclusive criteria are excluded from the datasets for the GUI.

In some embodiments, the dataset filtering module 120 causes the GUI generation module 118 to generate a GUI for a user to input a filtering criteria along with or separately from the GUI for presenting relationship among datasets. An example of the GUI for inputting filtering criteria is described below with reference to FIG. 2.

Although illustrated in FIG. 1 as a single component, the computer system(s) 106 and the user device(s) 130 may each include a plurality of individual components (e.g., computer devices) each programmed with at least some of the functions described herein. In this manner, some components of the computer system(s) 106 and/or the user device(s) 130 may perform some functions while other components may perform other functions, as would be appreciated. The one or more processors 108 may each include one or more physical processors that are programmed by computer program instructions. The various instructions described herein are exemplary only. Other configurations and numbers of instructions may be used, so long as the processor(s) 108 are programmed to perform the functions described herein.

Furthermore, it should be appreciated that although the various instructions are illustrated in FIG. 1 as being co-located within a single processing unit, in implementations in which processor(s) 108 includes multiple processing units, one or more instructions may be executed remotely from the other instructions.

Additionally, the modular breakdown as illustrated in FIG. 1 is prepared for illustrative purposes only. The various instructions described with respect to specific modules may be implemented by alternative modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 108 may be programmed by one or more additional instructions that may perform some or all of the functionality attributed herein to one of the instructions.

The various instructions described herein may be stored in a storage device 110, which may comprise random access memory (RAM), read only memory (ROM), and/or other memory. The storage device may store the computer program instructions (e.g., the aforementioned instructions) to be executed by processor 108 as well as data that may be manipulated by processor 110. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

In some embodiments, the dataset database 104 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The databases may comprise one or more such databases that reside in one or more physical devices and in one or more physical locations. The database may store a plurality of types of data and/or files and associated data or file descriptions, administrative information, or any other data.

In some embodiments, the dataset database 104 includes a referential table in which relationship among stored datasets are indicated. In a specific implementation, the referential table includes a plurality of entries, and each of the entries corresponding to a single dataset. Further, an entry of the referential table includes an identifier and metadata of a dataset, and also include various relationships with other datasets. For example, in an entry, the various relationships include identifiers of other datasets that matches a specific relationship type with respect to each of a plurality of relationship types (e.g., analysis relationship, modification relationship, user-interaction relationship, etc.), and also includes a proximate degree with respect to each of the related datasets. In some embodiments, when the GUI generation module 118 generates a GUI presenting relationships among datasets, the GUI generation module 118 selectively reads through entries of datasets for which the GUI is to be generated, and recognizes the relationships. When the datasets for which the GUI is presented are filtered by the dataset filtering module 120, the GUI generation module 118 limits datasets to be referred to entries corresponding to the filtered datasets, and updates (regenerates) a GUI corresponding to the filtered datasets.

Figure 2:
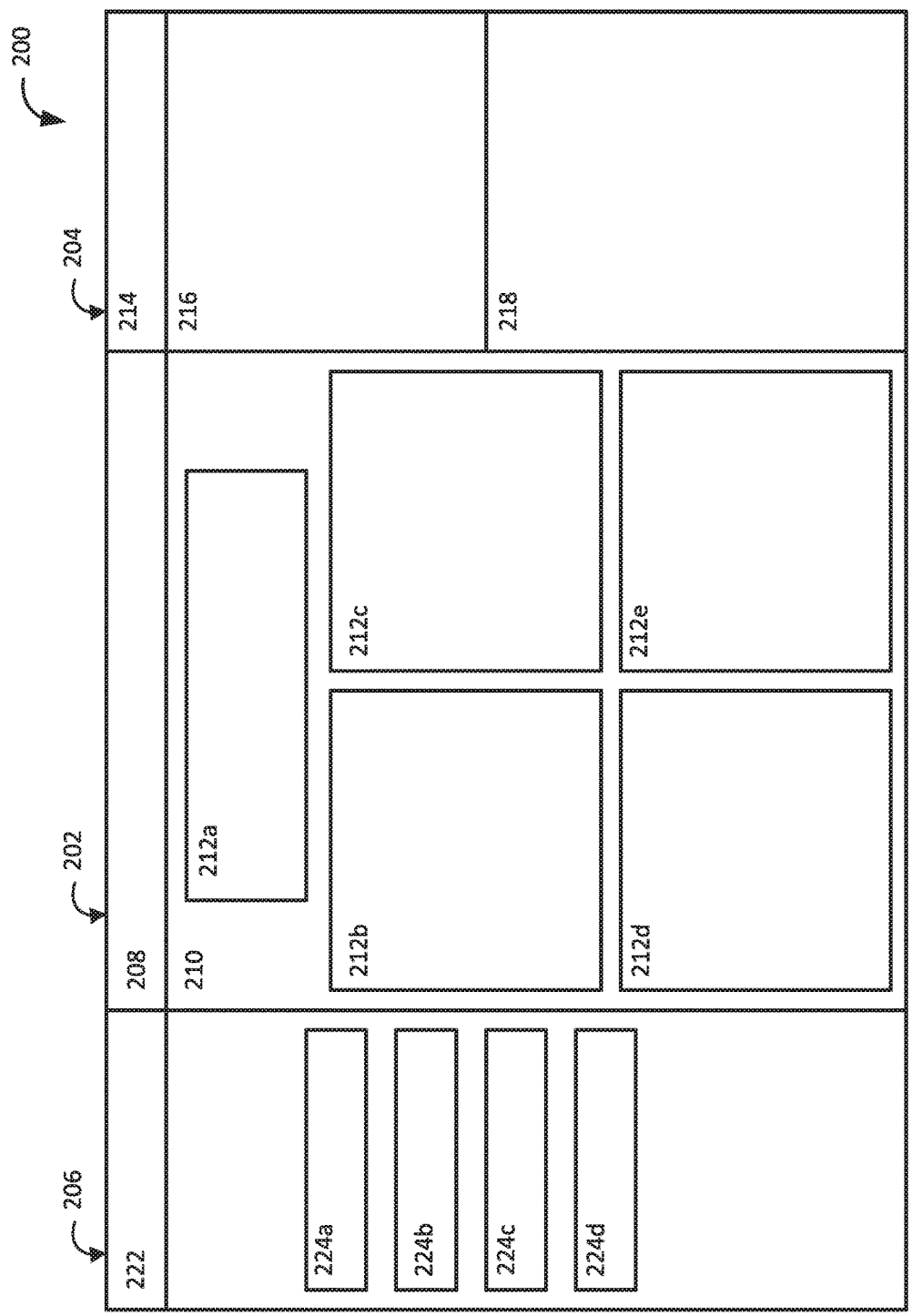
FIG. 2 illustrates an example of a graphical user interface (GUI) for presenting dataset relationships according to some embodiments.

FIG. 2 illustrates an example of a GUI 200 for presenting dataset relationships according to some embodiments. In the example shown in FIG. 2, the GUI 200 is intended to represent a GUI generated and presented by an applicable module such as the GUI generation module 118 in FIG. 1. In some embodiments, the GUI 200 includes a main field 202 that is expandable to a full-screen size based on user input, a first auxiliary field 204, and a second auxiliary field 206. In some embodiments, the main field 202 includes a title field 208 and a content field 210. In a specific implementation, the title field 208 includes title text representing the main field 202, such as "dataset relationship viewer." In a specific implementation, the title field 208 further includes selectable objects (e.g., tab, icon, etc.) to present a node map GUI and a non-map statistic GUI, respectively, and a selectable object (e.g., tab, icon, etc.) to pull up the second auxiliary field 206. For example, when a selectable object to present a node map GUI is selected (or active), the node map GUI is presented in the main field 202, and when a selectable object to present a node map GUI is selected (or active), the non-map statistic GUI is presented in the main field 202.

In some embodiments, when a non-map statistic GUI is presented in the main field 202, the content field 210 includes a plurality of content subfields 212a-212e. Each of the content subfields 212a-212e presents unique dataset relationship information. For example, one of the content subfields 212a-212e (e.g., the content subfield 212a) presents a total number of datasets for which the GUI is presented, a total number of analysis datasets included in the datasets for which the GUI is presented, a total number of users associated with (e.g., authored, accessed, and/or modified by) the datasets for which the GUI is presented, and a total number of links each of which corresponds to a relationship between two datasets. In another example, one or more of the content subfields 212a-212e (e.g., the content subfield 212b) presents a list of most analyzed datasets in a sorted order (e.g., descending order) along with visualization such as bar graph presenting the number of analysis associated with each dataset. In another example, one or more of the content subfields 212a-212e (e.g., the content subfield 212c) presents a list of most viewed analyses in a sorted order (e.g., descending order) along with visualization such as bar graph presenting the number of views of each analysis dataset. In still another example, one or more of the content subfields 212a-212e (e.g., the content subfield 212d) presents a list of most linked datasets in a sorted order (e.g., descending order) along with visualization such as bar graph presenting the number of links of each dataset. In still another example, one or more of the content subfields 212a-212e (e.g., the content subfield 212e) presents a list of authors (e.g., users) in a sorted order (e.g., descending order) along with visualization such as bar graph presenting the number of datasets generated by the authors. In still another example, one or more of the content subfields 212a-212e (e.g., the content subfield 212b) presents a list of datasets in a sorted order (e.g., descending order) along with visualization such as bar graph presenting the number of modification datasets crated from each dataset. In still another example, a first one of the content subfields 212a-212e (e.g., the content subfield 212d) presents a list of datasets and a second one of the content subfields 212a-212e (e.g., the content subfield 212e) presents a list of datasets that are analyzed together with respect to each of the datasets in the first one of the content subfields 212a-212e in a sorted order (e.g., descending order) along with visualization such as bar graph presenting the number of analyzed-in datasets.

In some embodiments, the unique dataset relationship information may also include versions of datasets accessed by users, evolution of usage of datasets according to passage of time, a chain of analysis (i.e., a sequence of analysis datasets each of which is generated based on analysis of another analysis dataset), most-frequently-accessed users for a dataset, other users who also accessed the same dataset, user access patterns, and so on.

In some embodiments, the first auxiliary field 204 includes a search field 214, a content field 216, and a metadata field 218. In a specific implementation, the search field 214 includes a searching box for searching one or more specific datasets. For example, specific data corresponding to one or more datasets input in the searching box is presented in the content field 216 and/or the metadata field 218. When input in the searching box matches more than one datasets, a list of matching datasets may be presented, such that one of the matching datasets can be selected based on user input. In a specific implementation, the content field 216 is provided to present a mini node map indicating relationship of one or more datasets (hereinafter searched datasets) input in the search field 214 with one or more other datasets that have direct or close relationship with the searched datasets. In a specific implementation, the metadata field 218 is provided to present metadata of the searched datasets. For example, metadata of a dataset includes one or more of a name, a last modified date (and time), a data-source, a path, a description, and one or more datasets that have direct or close relationship with the dataset.

In some embodiments, the second auxiliary field 206 includes a title field 222 and a plurality of filtering objects 224a-d. In a specific implementation, the second auxiliary field 206 is presented upon user input to pull up the second auxiliary field 206, and hidden when the second auxiliary field 206 is not pulled up or closed. When the second auxiliary field 206 is not presented, the main field 202 may expand to the region for the second auxiliary field 206 In some embodiments, the title field 222 includes title text representing the second auxiliary field 206, such as "filters." In some embodiments, each of the filtering objects 224a-d is a box for inputting or selecting a filtering criteria to filter datasets for which dataset relationship is to be presented in the main field 202 and/or the first auxiliary field 204. Based on the input or selection made in the filtering objects 224a-d, an applicable module such as the dataset filtering module 120 in FIG. 1 filters dataset for which the GUI is generated, and updated data corresponding to the filtered datasets are presented in the main field 202 and/or the first auxiliary field 204.

FIG. 3 illustrates examples of a node map GUI for presenting dataset relationships according to some embodiments. In the example shown in FIG. 3, the node map GUI includes a node map 302a in a first instance, and includes a focused node map 302b in a second instance different from the first instance. In some embodiments, the node map GUI is presented in an applicable presentation field such as the main field 202 shown in FIG. 2. In some embodiments, in a node map included in the node map GUI, each of a plurality of dots (nodes) represents a dataset and each of a plurality of lines (links) connecting dots represents a relationship of connected dots. A length of a line is determined based on an proximity degree of relationship between related datasets, which are determined according to a DGC algorithm. In some embodiments, the datasets are presented by different colors depending on the type of datasets, and legend showing correspondence between colors and type of datasets are presented in the node map. For example, original datasets are presented by dots of a first color, analysis datasets are presented by dots of a second color, and user-interaction datasets are presented by dots of a third color. In some embodiments, a node map GUI is expandable to a full-screen size, and a size, a zoom ratio, and/or an angle of node map in the node map GUI can be arbitrarily selectable, for example, based on user input. In some embodiments, one or more of the dots and/or the lines in a node map are selectable, and upon selection of a dot or a line, detailed information about the selected dot or line is presented in a graphical interface field such as the first auxiliary field 204 shown in FIG. 2.

In some embodiments, the focused node map 302a shows relationships of all datasets that are currently selected (and filtered). According to the focused node map 302a, a user may recognize that a plurality of analysis datasets are generated based on each of some original datasets, and some original datasets are interacted by some users, i.e., related to some user-interaction datasets. Also, a user may recognize that some analysis datasets are generated based on other analysis datasets. When a single dot corresponding to a single dataset is selected from the node map 302*a*, the focused node map 302*b* is presented.

In some embodiments, the focused node map 302*b* shows relationships among datasets that are in direct and/or close relationship with a selected dataset with emphasis over datasets that are not in direct and/or close relationship with the selected dataset. According to the focused node map 302*b*, a user may recognize dataset relationship of datasets associated with a selected dataset. Depending on a specific implementation of the embodiments, any applicable manner of emphasis can be employed. For example, datasets that are not in direct and/or close relationship with a selected dataset may be presented with blurred dots and lines, faint-color dots and lines, partially-transparent dots and lines, smaller dots and thinner lines, and so on.

Figure 4:
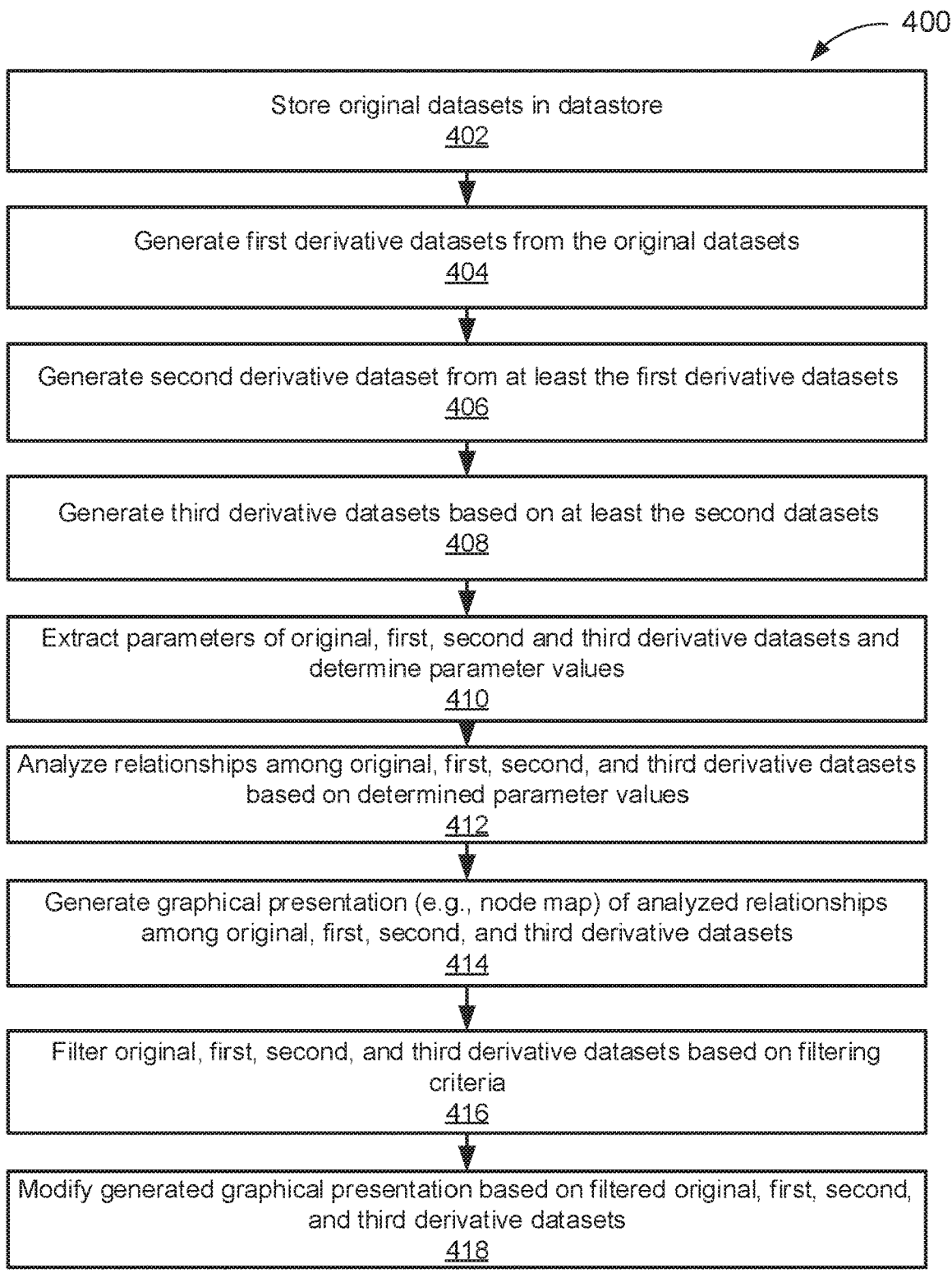
FIG. 4 is a flowchart of an example of a method for managing relationships among datasets according to some embodiments.

FIG. 4 is a flowchart 400 of an example of a method for managing relationships among datasets according to some embodiments. This flowchart described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In module 402 of FIG. 4, original datasets are stored in datastore. An applicable module for receiving and/or generating original datasets, such as the dataset generation and reception module 112 in FIG. 1, receives and/or generates the original datasets. In a specific implementation, the original datasets are received and/or generated at different timings, and upon reception and/or generation of original datasets, the received and/or generated original datasets are stored in the datastore. For the datastore, applicable datastore such as the dataset database 104 in FIG. 1 is employed.

In module 404 of FIG. 4, first derivative datasets are generated and stored in datastore. An applicable module for generating first derivative datasets, such as the dataset generation and reception module 112 in FIG. 1, generates the first derivative datasets. The first derivative datasets are generated directly based on one or more of the stored original datasets (and not based on other first derivative datasets nor other derivative datasets of larger degree (e.g., second, third, . . . derivative datasets)). In a specific implementation, the first derivative datasets may include one or more types of analysis datasets, user-interaction datasets, modification datasets. In a specific implementation, the first derivative datasets are generated based on user manipulation of the original datasets, and/or automatically generated based on a specific analysis and/or modification algorithm applied to original datasets. For the datastore, applicable datastore such as the dataset database 104 in FIG. 1 is employed.

In module 406 of FIG. 4, second derivative datasets are generated and stored in datastore. An applicable module for generating second derivative datasets, such as the dataset generation and reception module 112 in FIG. 1, generates the second derivative datasets. The second derivative datasets are generated at least based on one or more of the first derivative datasets (and not based on other second derivative datasets nor other derivative datasets of larger degree (e.g., third, fourth, . . . derivative datasets), in a similar manner as generation of the first derivative dataset performed in module 404. That is, in a specific implementation, the second derivative datasets may include one or more types of analysis datasets, user-interaction datasets, modification datasets. Also, in a specific implementation, the second derivative datasets are generated based on user manipulation of the first datasets (and original datasets), and/or automatically generated based on a specific analysis and/or modification algorithm applied to first datasets (and the original datasets). For the datastore, applicable datastore such as the dataset database 104 in FIG. 1 is employed.

In module 408 of FIG. 4, third derivative datasets are generated and stored in datastore. An applicable module for generating third derivative datasets, such as the dataset generation and reception module 112 in FIG. 1, generates the third derivative datasets. The third derivative datasets are generated at least based on one or more of the second derivative datasets (and not based on other third derivative datasets nor other derivative datasets of larger degree (e.g., fourth, fifth, . . . derivative datasets), in a similar manner as generation of the first derivative dataset performed in module 404 and/or the second derivative dataset performed in module 406.

In module 410 of FIG. 4, parameters of stored datasets, such as the original, first, second, third, . . . , datasets are extracted and parameter values of the extracted parameters are determined. An applicable module for extracting parameters and determining parameter values, such as the dataset parameter extraction module 114 in FIG. 1, extract parameters and determined parameter valued with respect to the stored datasets. In some implementation, the parameters are extracted from metadata of the stored datasets. In some implementation, the parameters are extracted from contents of the stored datasets.

In module 412 of FIG. 4, relationships among stored datasets, such as the original, first, second, third, . . . , datasets are determined based the parameter values of the parameters extracted from the stored datasets. An applicable module for determining relationships among stored datasets, such as the dataset parameter analysis module 116 in FIG. 1, determines the relationships among the stored datasets. In a specific implementation, the type of relationships among the stored datasets such as an analysis relationship, an inclusive relationship, a modification relationship, and user relationship is determined in module 410. Also, a proximate degree of the relationships among the stored datasets is determined based on an applicable algorithm such as the DGC algorithm in module 410.

In module 414 of FIG. 4, graphical presentation of analyzed relationships among the stored datasets, such as the original, first, second, third, . . . , datasets is generated. An applicable module for generating graphical presentation of analyzed relationships among the stored datasets, such as the GUI generation module 118 in FIG. 1, generates the graphical presentation of analyzed relationships among the stored datasets. In a specific implementation, the generated graphical presentation includes a non-map statistic GUI (e.g., the GUI 200 in FIG. 2) and/or a node-map GUI (e.g., the GUI 302*a*, 302*b* in FIG. 3).

In module 416 of FIG. 4, stored datasets for which the graphical presentation is generated is filtered based on filtering criteria. An applicable module for filtering stored datasets for which the graphical presentation is generated, such as the dataset filtering module 120 in FIG. 1, filters the stored datasets for which the graphical presentation is generated. In a specific implementation, the filtering criteria includes one or more of data source (e.g., in path, outside path), last update time, time elapsed since last build, type of datasets (e.g., original datasets, derivative datasets), data state of datasets (e.g., active, discarded, etc.) and key word, and so on.

In module 418 of FIG. 4, graphical presentation generated in module 414 is modified based on datasets filtered in module 416. An applicable module for modifying graphical presentation, such as the GUI generation module 118 in FIG. 1, modifies the graphical presentation based on the filtered datasets. In a specific implementation, the modification of the graphical presentation includes updates of statistic information presented in a non-map statistic GUI (e.g., the GUI 200 in FIG. 2) and/or updates by exclusion of nodes and links presented in a node map in a node-map GUI (e.g., the GUI 302a, 302b in FIG. 3).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. The word "module" may refer to a software module that may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more hardware processors; and
   a memory storing instructions that, when executed by the one or more hardware processors, cause the system to perform:
     storing original datasets in a datastore;
     generating first derivative datasets from the original datasets;
     generating second derivative datasets from at least the first derivative datasets;
     determining relationships among the original datasets, the first derivative datasets, and the second derivative datasets, based on an analytical relationship between two datasets, a similarity relationship between two datasets, a modification relationship between two datasets, and a user-interaction relationship between two datasets;

generating a node map including a plurality of nodes and links between the plurality of nodes, wherein the plurality of nodes comprise at least a part of the original datasets, the first derivative datasets, and the second derivative datasets, and the links represent at least a part of the determined analytical, similarity, modification, and user-interaction relationships;

presenting data of the node map in a main field of a graphical user interface (GUI);

presenting searched or selected data of the node map in an auxiliary field of the GUI, the auxiliary field being presented at a side of the main field;

inputting or selecting, in a second auxiliary field of the GUI, criteria for filtering the original datasets, the first derivative datasets, and the second derivative datasets, wherein the main field decreases in size in response to the second auxiliary field being opened; and in response to the inputting or selecting the criteria for filtering, updating the data of the node map in the main field and the searched or selected data of the node map in the auxiliary field based on the inputted or selected criteria for filtering, wherein:

the updating the data of the node map in the main field comprises generating a focused node map including a selected node associated with the criteria and one or more nodes linked with the selected node, and at least one of the linked nodes in the focused node map being visualized with emphasis based on respective types of each of the determined relationships.

2. The system of claim 1, wherein the instructions further cause the system to perform generating third derivative datasets based on consumption of at least the second derivative datasets, wherein the determined relationships are among the original datasets, the first derivative datasets, the second derivative datasets, and the third derivative datasets, and the node map also includes at least a part of the third derivative datasets as a node.

3. The system of claim 1, wherein the filtering is carried out at least based on times at which datasets were generated.

4. The system of claim 1, wherein the analytical relationship includes a relationship between a dataset and an analyzed dataset that was generated based on analysis of the dataset.

5. The system of claim 1, wherein the similarity relationship includes a relationship among a plurality of datasets that were analyzed together.

6. The system of claim 1, wherein the modification relationship includes a relationship between a dataset and a modified dataset that was generated based on modification of the dataset.

7. The system of claim 1, wherein the user-interaction relationship includes a relationship between a dataset and a user dataset of a user that has interacted with the dataset.

8. The system of claim 1, wherein representations of the node map are generated repeatedly at different points in time, and the instructions further cause the system to perform presenting transition of the generated representations, the presenting transition of the generated representations comprising showing a transition of the determined relationships indicating a degree of directness or a proximity among nodes of the generated representations over time.

9. A computer implemented method performed on a computer system having one or more hardware processors programmed with computer program instructions that, when executed by the one or more hardware processors, cause the computer system to perform the method, the method comprising:

storing original datasets in a datastore;

generating first derivative datasets from the original datasets;

generating second derivative datasets from at least the first derivative datasets;

determining relationships among the original datasets, the first derivative datasets, the second derivative datasets, based on an analytical relationship between two datasets, a similarity relationship between two datasets, a modification relationship between two datasets, and a user-interaction relationship between two datasets;

generating a node map including a plurality of nodes and links between the plurality of nodes, wherein the plurality of nodes comprise at least a part of the original datasets, the first derivative datasets, and the second derivative datasets, and the links represent at least a part of the determined analytical, similarity, modification, and user-interaction relationships;

presenting data of the node map in a main field of a graphical user interface (GUI);

presenting searched or selected data of the node map in an auxiliary field of the GUI, the auxiliary field being presented at a side of the main field;

inputting or selecting, in a second auxiliary field of the GUI, criteria for filtering the original datasets, the first derivative datasets, and the second derivative datasets, wherein the main field decreases in size in response to the second auxiliary field being opened; and in response to the inputting or selecting the criteria for filtering, updating the data of the node map in the main field and the searched or selected data of the node map in the auxiliary field based on the inputted or selected criteria for filtering, wherein:

the updating the data of the node map in the main field comprises generating a focused node map including a selected node associated with the criteria and one or more nodes linked with the selected node, and at least one of the linked nodes in the focused node map being visualized with emphasis based on respective types of each of the determined relationships.

10. The method of claim 9, further comprising generating third derivative datasets based on consumption of at least the second derivative datasets, wherein the determined relationships are among the original datasets, the first derivative datasets, the second derivative datasets, and the third derivative datasets, and the node map also includes at least a part of the third derivative datasets as a node.

11. The method of claim 9, wherein the filtering is carried out at least based on times at which datasets were generated.

12. The method of claim 9, wherein the analytical relationship includes a relationship between a dataset and an analyzed dataset that was generated based on analysis of the dataset.

13. The method of claim 9, wherein the similarity relationship includes a relationship among a plurality of datasets that were analyzed together.

14. The method of claim 9, wherein the modification relationship includes a relationship between a dataset and a modified dataset that was generated based on modification of the dataset.

15. The method of claim 9, wherein the user-interaction relationship includes a relationship between a dataset and a user dataset of a user that has interacted with the dataset.

16. The method of claim 9, wherein representations of the node map are generated repeatedly at different points in time, and the instructions further cause the system to perform presenting transition of the generated representations, the presenting transition of the generated representations comprising showing a transition of the determined relationships indicating a degree of directness or a proximity among nodes of the generated representations over time.

* * * * *